United States Patent [19]

Dam G. et al.

[11] Patent Number: 5,064,467
[45] Date of Patent: Nov. 12, 1991

[54] METHOD AND APPARATUS FOR THE DIRECT REDUCTION OF IRON

[75] Inventors: Oscar G. Dam G.; Henry R. Bueno C., both of Bolivar, Venezuela

[73] Assignee: C.V.G. Siderurgica Del Orinoco, C.A., Bolivar, Venezuela

[21] Appl. No.: 455,232

[22] Filed: Dec. 22, 1989

Related U.S. Application Data

[63] Continuation-in-part of Ser. No. 115,911, Nov. 25, 1987, abandoned.

[51] Int. Cl.$^5$ .................... C21B 13/02; C21B 13/14
[52] U.S. Cl. .................... 75/495; 423/651; 75/490; 75/451
[58] Field of Search .................... 423/138, 650, 651; 75/34, 36, 444, 445, 446, 450, 451, 490, 491, 495

[56] References Cited

U.S. PATENT DOCUMENTS

| | | | |
|---|---|---|---|
| Re. 32,247 | 9/1986 | Stephens, Jr. | 75/446 |
| 3,210,180 | 10/1965 | Jukkola | 75/451 |
| 3,303,017 | 2/1967 | Mayer et al. | 75/451 |
| 3,364,011 | 1/1968 | Porter et al. | 75/451 |
| 3,375,098 | 3/1968 | Marshall | 75/496 |
| 3,562,780 | 2/1971 | Eisenberg | 75/451 |
| 3,635,456 | 1/1972 | Anthes et al. | 266/197 |
| 3,936,296 | 2/1976 | Campbell | 75/446 |
| 3,985,547 | 10/1976 | Iacotti et al. | 75/451 |
| 4,045,214 | 8/1977 | Wetzel et al. | 75/446 |
| 4,046,557 | 9/1977 | Beggs | 75/496 |
| 4,253,867 | 3/1981 | Price-Falcon et al. | 75/495 |
| 4,261,734 | 4/1981 | Price-Falcon et al. | 75/495 |
| 4,425,159 | 1/1984 | Nixon | 75/505 |
| 4,528,030 | 7/1985 | Vera et al. | 75/496 |
| 4,566,904 | 1/1986 | Von Bogdandy et al. | 75/446 |
| 4,668,284 | 5/1987 | Vera et al. | 75/495 |
| 4,880,458 | 11/1989 | Martinez-Vera et al. | 75/498 |
| 4,940,488 | 7/1990 | Maeda et al. | 75/446 |
| 4,946,498 | 8/1990 | Weber | 75/446 |

FOREIGN PATENT DOCUMENTS

| | | | |
|---|---|---|---|
| 534830 | 12/1956 | Canada | 75/451 |
| 1268478 | 6/1961 | France | 75/451 |

*Primary Examiner*—Gary P. Straub
*Attorney, Agent, or Firm*—Bachman & LaPointe

[57] ABSTRACT

A process for the direct reduction of iron-containing metal oxides to obtain iron is disclosed in which a reformed reduction gas rich in $H_2$ and CO and having an oxidation degree in the range of from about 0.30 to about 0.35 is formed and reduction is carried out simultaneously in a single reaction zone of a reduction reactor. The reformed reduction gas is formed using a highly endothermic reaction during which a mixture of heated natural gas, recycled top gas and air, preferably oxygen enriched air, is placed into contact with heated surfaces of DRI metallized iron in the reaction zone. The resulting reformed reducing gas consists essentially of from about 45% to about 48% hydrogen, from about 32% to about 34% carbon monoxide, from about 2% to about 4% carbon dioxide, from about 1% to about 3% methane, from about 14% to about 16% nitrogen and from about 1% to about 3% water vapor.

12 Claims, 1 Drawing Sheet

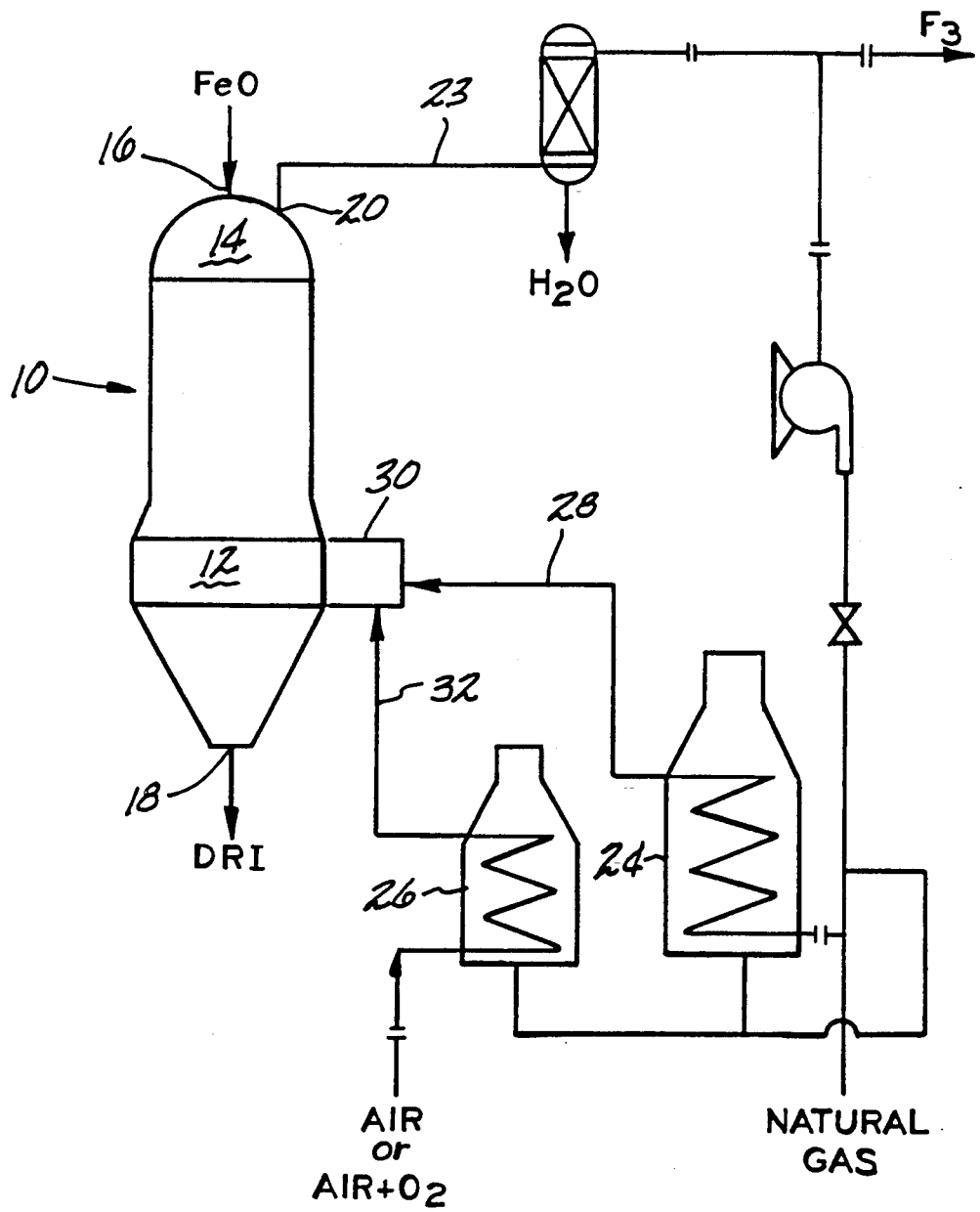

METHOD AND APPARATUS FOR THE DIRECT REDUCTION OF IRON

CROSS-REFERENCE TO RELATED APPLICATIONS

This is a continuation-in-part of co-pending U.S. patent application Ser. No. 115,911, filed Nov. 25, 1987 for Method and Apparatus For the Direct Reduction of Iron, now abandoned.

BACKGROUND OF THE INVENTION

The present invention is drawn to a process for the direct reduction of metal oxides containing iron to a metallized iron product.

The direct reduction of iron oxide, in forms such as pellets or lump ore, to metallic iron in the solid state has become a commercial reality throughout the world in recent years. The combined annual capacity of direct reduction plants currently in operation or under construction is in excess of 15 million metric tons of direct reduced iron product, which is used primarily for feedstock in electric arc steelmaking furnaces. The world demand for additional direct reduced iron is projected to increase at a substantial rate for many years to satisfy a growing world need for such feedstock, as additional electric arc furnace steelmaking plants are constructed.

Known processes for the direct reduction of iron oxide to metallic iron utilize a reformed gas as the reducing agent. Natural gas is used as a source for generating the reformed gas. The reformed gas for use in the direct reduction process is generated in a unit called a reformer by contacting the natural gas with an oxygen containing material in the presence of a catalyst, usually a nickel catalyst, which activates the reformation reaction of the natural gas so as to yield a reformed gas which is rich in $H_2$ and CO. The reformed gas which is collected from the reformer is thereafter fed to a reduction reactor containing the iron oxide material wherein the direct reduction reaction is carried out. Thus, direct reduction processes heretofore known require two distinct reaction zones for carrying out the actual direct reduction process. In these conventional processes it is required that the reformed gas product in the first zone be treated prior to entering the reduction zone in order to remove $CO_2$ and/or water vapor.

Naturally, it would be highly desirable to provide a method for the direct reduction of iron oxide materials to metallic iron which would eliminate the necessity of separate reaction zones and the use of nickel catalysts.

Accordingly, it is the principal object of the present invention to provide an improved process for the direct reduction of metal oxides containing iron to a metallized iron product.

It is a particular object of the present invention to provide a method as set forth above which is carried out in the single reaction zone of a direct reduction reactor.

It is a further object of the present invention to provide a method as set forth above wherein DRI material is used as a catalyst to produce a reformed gas directly in the reaction zone of a direct reduction reactor.

It is still further object of the present invention to provide an apparatus for carrying out the method of the present invention.

Further objects and advantages of the present invention will appear hereinbelow.

SUMMARY OF THE INVENTION

In accordance with the present invention the foregoing objects and advantages are readily obtained.

The present invention is drawn to a process for the direct reduction of metal oxides containing iron to a metallized iron product and an apparatus for the direct reduction of the metal oxides with the reformed gas.

The process for the direct reduction of metal oxides containing iron to a metallized iron product in accordance with the present invention comprises providing a reduction reactor having a single reaction zone and partially metallized iron oxide material and direct reduced iron (DRI) in the reaction zone, forming a reformed reduction gas rich in $H_2$ and CO having an oxidation degree in the range of from about 0.05 to about 0.08 in the reaction zone, and contacting the iron containing metal oxide material in the reaction zone with the reformed reducing gas to effect reduction of iron oxide to iron.

In accordance with the present invention, the reformed gas is produced by mixing top gas recycled from the reactor with natural gas, preheating the gas mixture to a temperature in the range of from about 650° C. to about 850° C., mixing air, preferably enriched with oxygen, preheated to a temperature in the range from about 650° C. to about 850° C. with the preheated top gas and natural gas mixture in a mixing chamber and introducing said gases having an oxidation degree of from about 0.30 to about 0.35 into the reaction zone. Exposure of this gas mixture to the hot DRI metallized iron in the reaction zone causes a highly endothermic reforming reaction. The resulting reformed reduction gas has a composition by volume consisting essentially of from about 45% to about 48% hydrogen, from about 32% to about 34% carbon monoxide, from about 2% to about 4% carbon dioxide, from about 1% to about 3% methane, from about 14% to about 16% nitrogen and from about 1% to about 3% water vapor having an oxidation degree in the range of from about 0.05 to about 0.08 in the reduction zone.

The process of the present invention allows for a single reaction zone of a direct reduction reactor to be employed for the simultaneous production of the reformed gas for use in the reduction process and the actual direct reduction of the iron containing oxide material. It has been found that this simultaneous reforming-reduction approach greatly improves the overall efficiency of the reduction process. It also permits the reduction process to be carried out at much reduced levels of energy consumption. The average total energy consumption of the process is calculated to be about 9.4 GJ per ton of product of which about 2.3% is supplied as electrical energy.

BRIEF DESCRIPTION OF THE DRAWINGS

The FIGURE is a schematic illustration of an apparatus for performing the process of the present invention.

DETAILED DESCRIPTION

The process for the direct reduction of iron-containing metal oxides to a metallized iron product of the present invention may be carried out using the apparatus schematically illustrated in the FIGURE.

A shown in the FIGURE, the apparatus comprises a reduction reactor 10 having a combined reforming—reduction reaction zone 12, an iron oxide feed preheat and prereduction zone 14, an inlet 16 for introducing an iron-containing metal oxide feed into the reactor, and an outlet 18 for withdrawing direct reduced metallized iron. The reactor also has an outlet 20 for permitting the removal of top gases.

The iron-containing metal oxides introduced into the reactor may be in pellet form. Typically, they contain from about 63% to about 68% iron by weight. The direct reduced iron withdrawn from the reactor typically contains from about 85% to about 90% iron by weight.

The top gas which is withdrawn has a composition by volume consisting essentially of from about 28% to 36% hydrogen, from about 17% to about 21% carbon monoxide, from about 13% to about 17% carbon dioxide, from about 2% to about 7% methane, from about 16% to about 18% nitrogen and from about 12% to about 17% water vapor. Its temperature is typically in the range of from about 300° to about 350° C. It also typically has a degree of oxidation $\eta_o$ the range of from about 0.33 to 0.35 and reducing power $\eta_R$ in the range of 1.6 to 1.7. As used herein, $$\eta_o = \frac{CO_2 + H_2O}{CO_2 + H_2O + CO} \quad (1)$$

and $$\eta_R = \frac{CO + H_2}{CO_2 + H_2O} \quad (2)$$

The top gases withdrawn from the reactor 10 are passed to a unit 22 via conduit 23 for cooling the gases to a temperature in the range of about 40° C. to about 60° C. and for removing water. The amount of water remaining in the gases after they pass through unit 22 is from about 1% to about 3% by volume. The unit 22 may comprise any suitable water separator know in the art.

After dewatering, the top gas is split. A first portion of the gas is used as a fuel for preheaters 24 and 26. The remaining top gas is mixed with natural gas in a ratio of 4:1 and recycled to the preheater 24. In the preheater, the top gas—natural gas mixture is heated to a temperature in the range of from about 650° C. to about 850° C., preferably to a temperature in the range of from about 680° to about 720° C. The heated top-natural gas mixture flows via a conduit 28 to a mixing chamber 30 at a flow rate of 1000 to 1100 NM³/ton DRI.

Air, preferably enriched with oxygen in a ratio of air to oxygen of 7:1 to 1:7 is heated by the preheater 26 to a temperature in the range of from about 650° C. to about 850° C., preferably to a temperature in the range of from about 680° to about 720° C. The heated air is then transported to the mixing chamber 30 via conduit 32 at a flow rate of 70 NM³/ton DRI and combined with the mixture of natural gas and top gas. Prior to introduction into the reaction zone 12, the air—natural gas—top gas mixture is partially combusted. This partial combustion raises the temperature to a temperature above 850° C. and preferably to a temperature of between 1000°-1100° C. This partially oxidized gas is delivered to the reaction zone 12 stoichometrically balanced to obtain a $CH_4/(CO_2+H_2O)$ ratio of about 0.63:1 to about 0.67:1 and an oxidation degree of 0.30 to 0.35. In the mixing chamber, the gas mixture generally has a composition by volume of from about 35% to about 38% hydrogen, from about 15% to about 17% carbon monoxide, from about 18% to about 20% carbon dioxide, from about 15% to about 16% methane, from about 20% to about 22% nitrogen, from about 4% to about 7% water vapor, and from about 0.02% to about 0.3% $C_2H_6$. The entering gas mixture preferably has a degree of oxidation in the range of from about 0.27 to about 0.32 and a reducing power in the range of from about 2 to 3.

The gas stream from the mixing chamber 30 is introduced into the reaction zone 12 at a flow rate of 1100 NM³/ton DRI. The gas is thus placed in intimate contact with hot descending DRI material and/or the partially metallized iron oxide bed in the reaction zone 12. Under these circumstances, the metallic solid iron acts as a catalyst providing from about 12 to 16 sq. met./gr. iron specific surface area for the catalytic reaction. The heat from its surfaces causes a highly endothermic reforming reaction to occur. This reaction is as follows:

$$CH_4 + CO_2 = 2H_2 + CO \quad (1).$$

During the reaction, the pressure in the reactor is 1.2 atm.

The resulting reformed gas has a composition by volume of from about 45 to about 48% hydrogen, from about 32% to about 34% carbon monoxide, from about 2% to about 4% carbon dioxide, from about 1% to about 3% methane, from about 14% to about 16% nitrogen and from about 1% to about 3% water vapor. Typically, the reformed gas is present in an amount from about 1100 NM³/ton to about 1450 NM³/ton with respect to the iron oxide material.

It has been found that as a result of the endothermic reaction, the temperature of the gas in the reaction zone decreases to a reaction temperature in the range of from about 820° C. to about 850° C.

It also has been found that this reformed reducing gas has a degree of oxidation in the range of about 0.05 to about 0.09 and a reducing power in the range of from about 11 to about 29. Table I below shows the composition of gases used in other direct reduction processes.

TABLE I

| Process | Fuel | Reforming by:— | Reforming at:— | H₂ | CO | CO₂ | H₂O | N₂ | CH₄ | η-o | ηH—C* |
|---|---|---|---|---|---|---|---|---|---|---|---|
| Wiberg | Coal + oil | top-gas steam | 1100° C. | 21.2 | 74.4 | 3.2 | 1.2 | — | | 0.04 | 0.29 |
| Midrex | Natural Gas | top-gas | 900° C. | 55* | 35* | | | | | 0.10* | 1.6* |
| Purofer | Natural | top-gas | up to 1400° C. | | | 1 | 1 | | 1 | 0.02 | 1.6* |
| Armco | Natural Gas | Steam 1.4:1 | 870° C. | 68 | 20 | 2.0 | 8.5 | 0.1 | 1.1 | 0.105 | 3.5 |
| Hyl | Natural | Steam | 850° C. | 75 | 14 | 8 | | | 3 | 0.03 | 3.3 |

TABLE I-continued

| Process | Fuel | Reforming by:— | at:— | Gas Analysis % | | | | | | | |
|---|---|---|---|---|---|---|---|---|---|---|---|
| | | | | H₂ | CO | CO₂ | H₂O | N₂ | CH₄ | η-o | ηH—C* |
| | Gas | (2.1) | | | | | | | | | |

*Estimated from performance of reformer operating data and the fact that the principle reforming gas is CO₂, top gas H₂O having been removed by scrubbing.

$$\text{*}\eta\text{H—C} = \frac{H_2 + H_2O}{CO_2 + CO}$$

The endothermic reaction (1) provides the amount of hydrogen and carbon monoxide required to carry out the following reduction reaction:

$$2FeO + H_2 + CO = Fe + H_2O + CO_2 \qquad (2).$$

This reaction occurs in the reaction zone simultaneously with the reforming reaction at the solid surface. This greatly adds to the overall efficiency of the process. The reaction (2) also provides the carbon dioxide necessary to continuously maintain the reforming reaction.

The ascending reducing gas produced in zone 12 has a composition containing methane, carbon monoxide, carbon dioxide, hydrogen, nitrogen and water vapor. A typical composition by volume is as follows: 5.4% CH₄, 25.5% CO, 5.1% CO₂, 46.5% H₂, 1.5% H₂O and 16.1% N₂. This ascending gas contains sufficient reducing power and temperature to preheat and prereduce the iron oxide feed descending in zone 14 of the reactor 10.

It should be noted that the process of the present invention takes advantage of the endothermic reaction taking place at the solid surface which hinders the effect of sinterization or sticking, thereby guaranting a smooth and continuous solid movement of the reduced material through the reactor. It should also be noted that no reformation of the reducing gas takes place outside of the reactor 10.

The reforming and reduction reactions which takes place in the reaction zone 12 remove enough heat from the hot metallized product surface to hinder the effect of sintering, clustering or agglomeration of the metallized particles.

The reactor 10 may comprise any suitable reactor known in the art. For example, it may be a shaft-furnace moving—bed type of reactor.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for the direct reduction of metal oxides containing iron to obtain a direct reduced iron, said process consisting essentially of:
   (a) providing a reforming-reduction reactor having a bed of partially metallized iron oxide material and a bed of direct reduced iron within said reforming-reduction reactor;
   (b) feeding metal oxides containing iron to the reforming-reduction reactor;
   (c) mixing top gas recycled from said reforming-reduction reactor with natural gas;
   (d) preheating said top gas and natural gas mixture to a temperature in the range of from about 650° C. to about 850° C.;
   (e) mixing air preheated to a temperature in the range of from about 650° C. to about 850° C. with said preheated top gas and natural gas mixture in a mixing chamber;
   (f) partially combusting said mixture to a temperature of between 850° C. to 1100° C. wherein said mixture has a degree of oxidation in the range of from about 0.27 to about 0.32 and a reducing power in the range of from about 2 to 3;
   (g) feeding said partially combusted mixture to said direct reduced iron in said reforming-reduction reactor so as to form a reformed reducing gas comprising H₂ and CO and having an oxidation degree in the range of from about 0.05 to about 0.09 in said reforming-reduction reactor; and
   (h) contacting said iron oxide metal in said reforming-reduction reactor with said reformed reducing gas so as to effect reduction to obtain a direct reduced iron.

2. A process according to claim 1 wherein said reformed reducing gas has a reducing power in the range of from about 11 to about 29.

3. A process according to claim 1 wherein said reformed reducing gas consists essentially of from about 45% to about 48% hydrogen, from about 32% to about 34% carbon monoxide, from about 2% to about 4% carbon dioxide, from about 1% to about 3% methane, from about 14% to about 16% nitrogen and from about 1% to about 3% water vapor.

4. The process of claim 1 wherein said reformed reducing gas forming step further comprises creating a highly endothermic reforming reaction in said reaction zone by exposing said gases to heated surfaces of direct reduced iron in said reaction zone,
   wherein said direct reduced iron acts as a catalyst and the temperature of said gases decreases to a temperature in the range of from about 800° C. to about 850° C.

5. The process of claim 4 wherein said reforming reaction comprises:

$$CH_4 + CO_2 = 2H_2 + CO.$$

6. The process of claim 5 further comprising reducing said iron oxide in said reaction zone to iron using said H₂+CO produced in said reforming reaction in accordance with the following reaction:

$$2FeO + H_2 + CO = Fe + H_2O + CO_2.$$

7. The process of claim 6 further comprising;
   preheating and prereducing said iron oxide feed by placing said feed into contact with an ascending portion of said reformed reducing gas.

8. The process of claim 4 wherein said to direct reduced iron has a surface area of between 12 to 16 $m^2/gr.$ of iron.

9. The process of claim 1 further comprising:
cleaning and dewatering said top gas leaving said reactor; and
supplying a portion of said cleaned and dewatered top gas to preheaters for preheating said top gas and natural gas mixture and said air.

10. The process of claim 1 wherein said air mixing step comprises mixing heated air enriched with $O_2$ with said heated top gas and natural gas mixture.

11. The process of claim 1 wherein said mixture is partially combusted to a temperature of between 1000° C. to 1100° C.

12. A process according to claim 1, wherein said top gas has a $CO_2$ content of between about 13% to 17%.

* * * * *